Nov. 23, 1926.  
L. D. SOUBIER  
1,607,651  
GLASS BLOWING MACHINE  
Filed Feb. 23, 1922  7 Sheets-Sheet 5
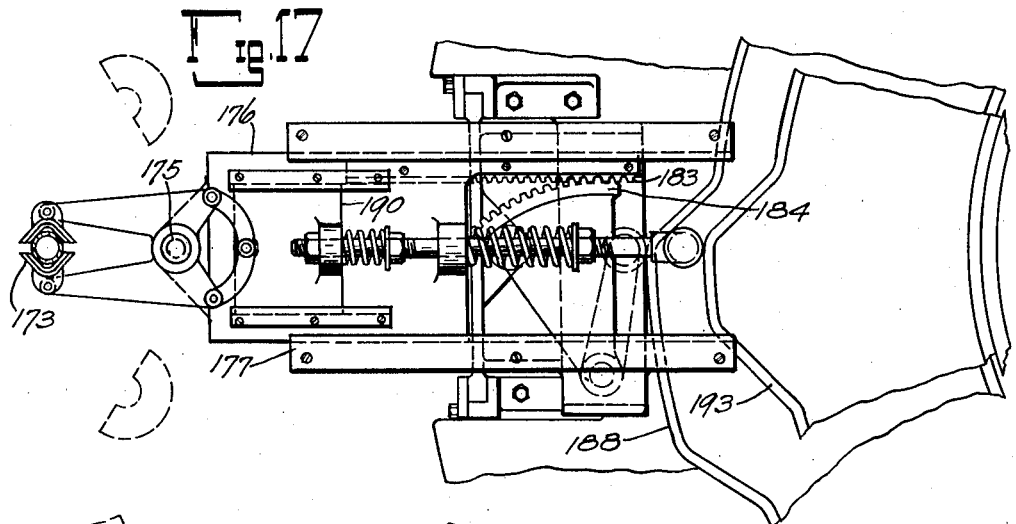
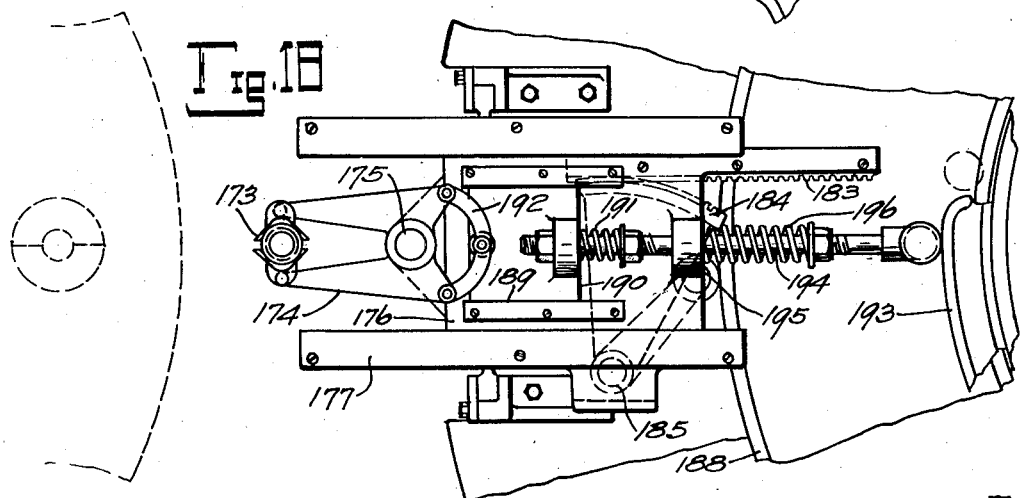
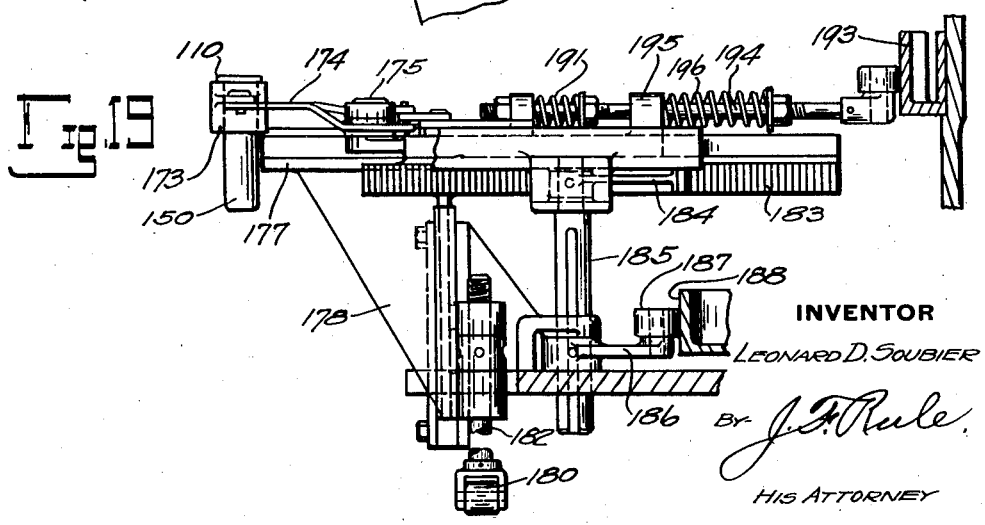
INVENTOR  
LEONARD D. SOUBIER  
BY J. F. Rule.  
HIS ATTORNEY Nov. 23, 1926.

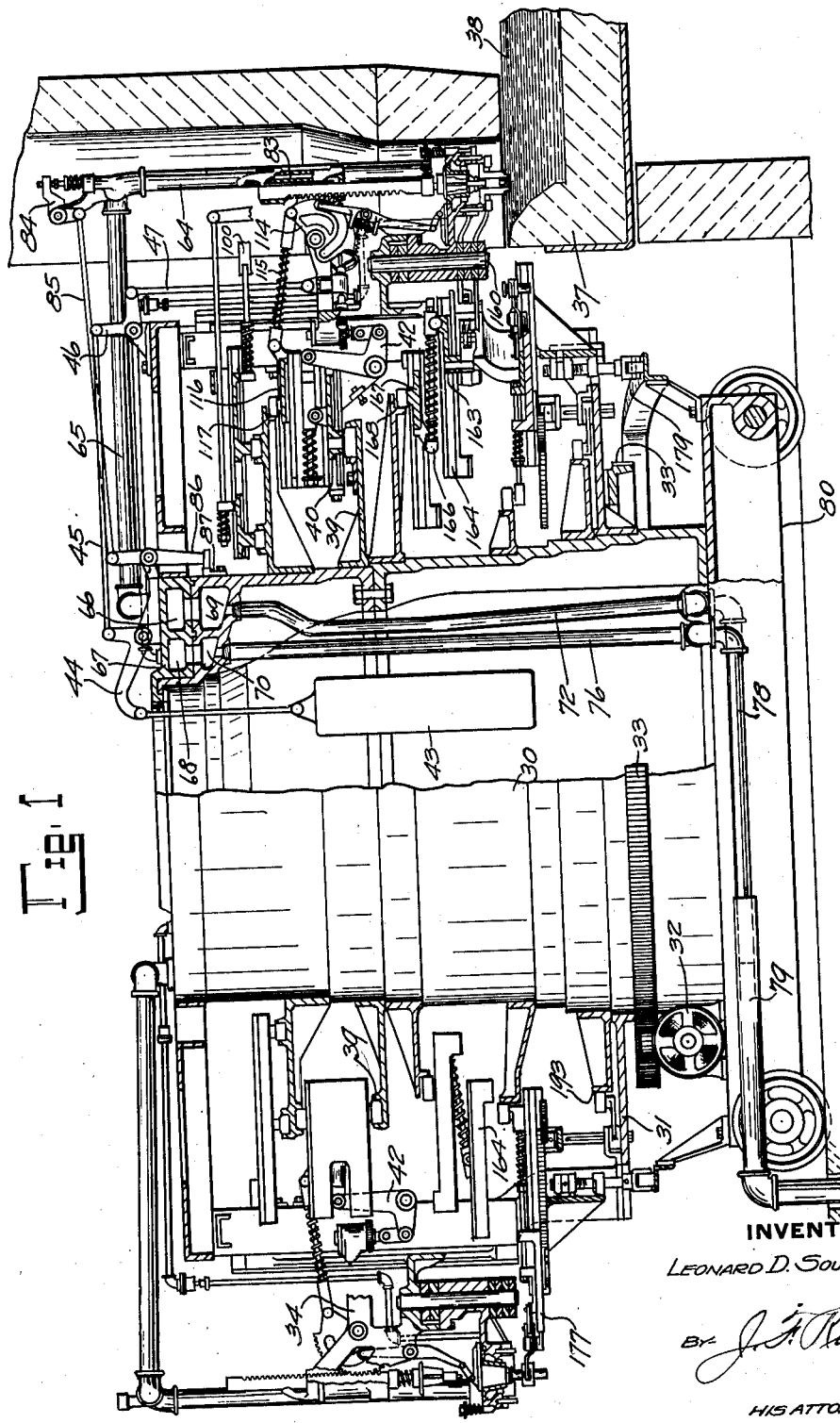

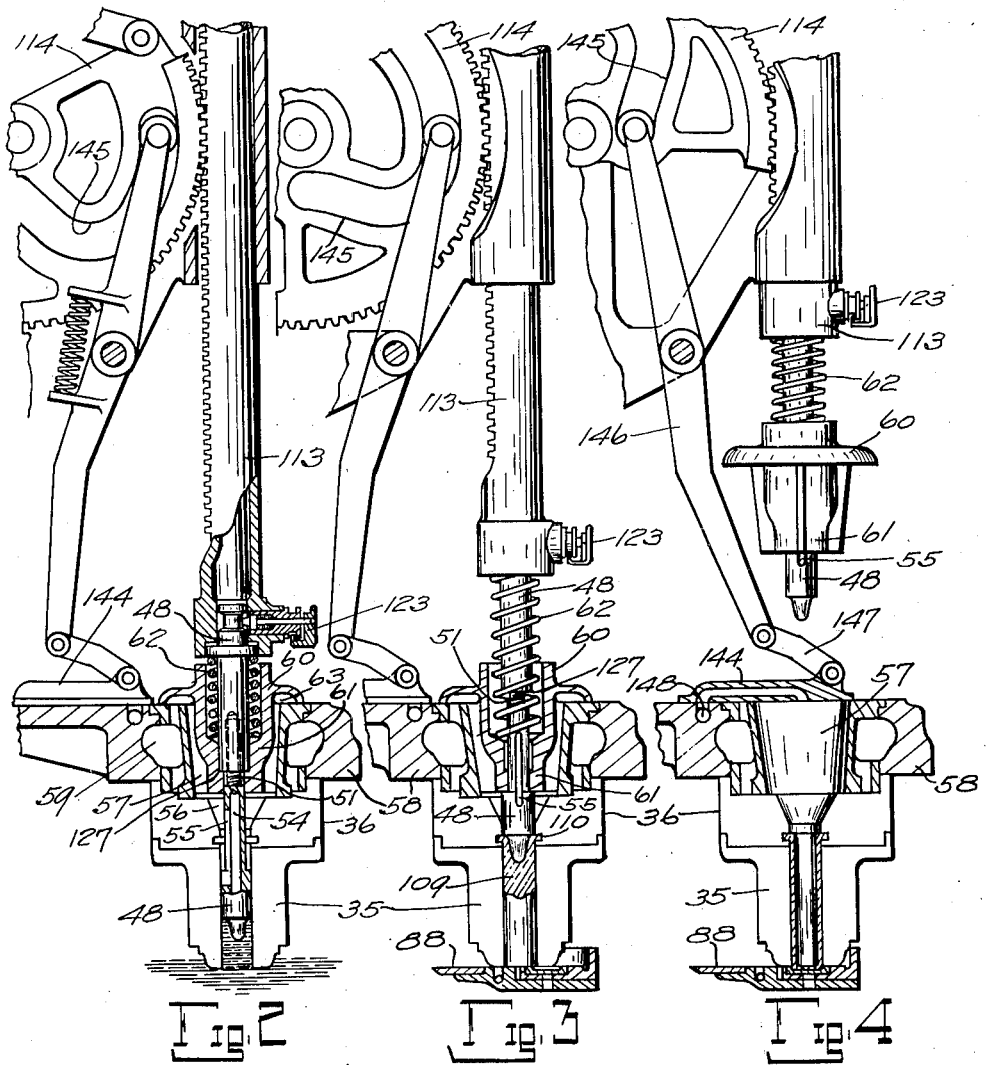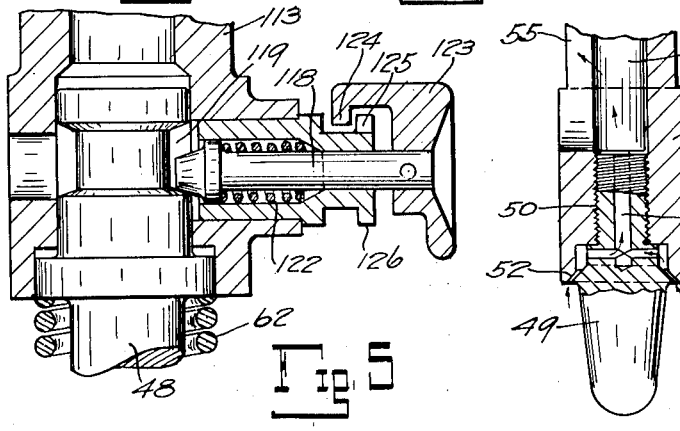

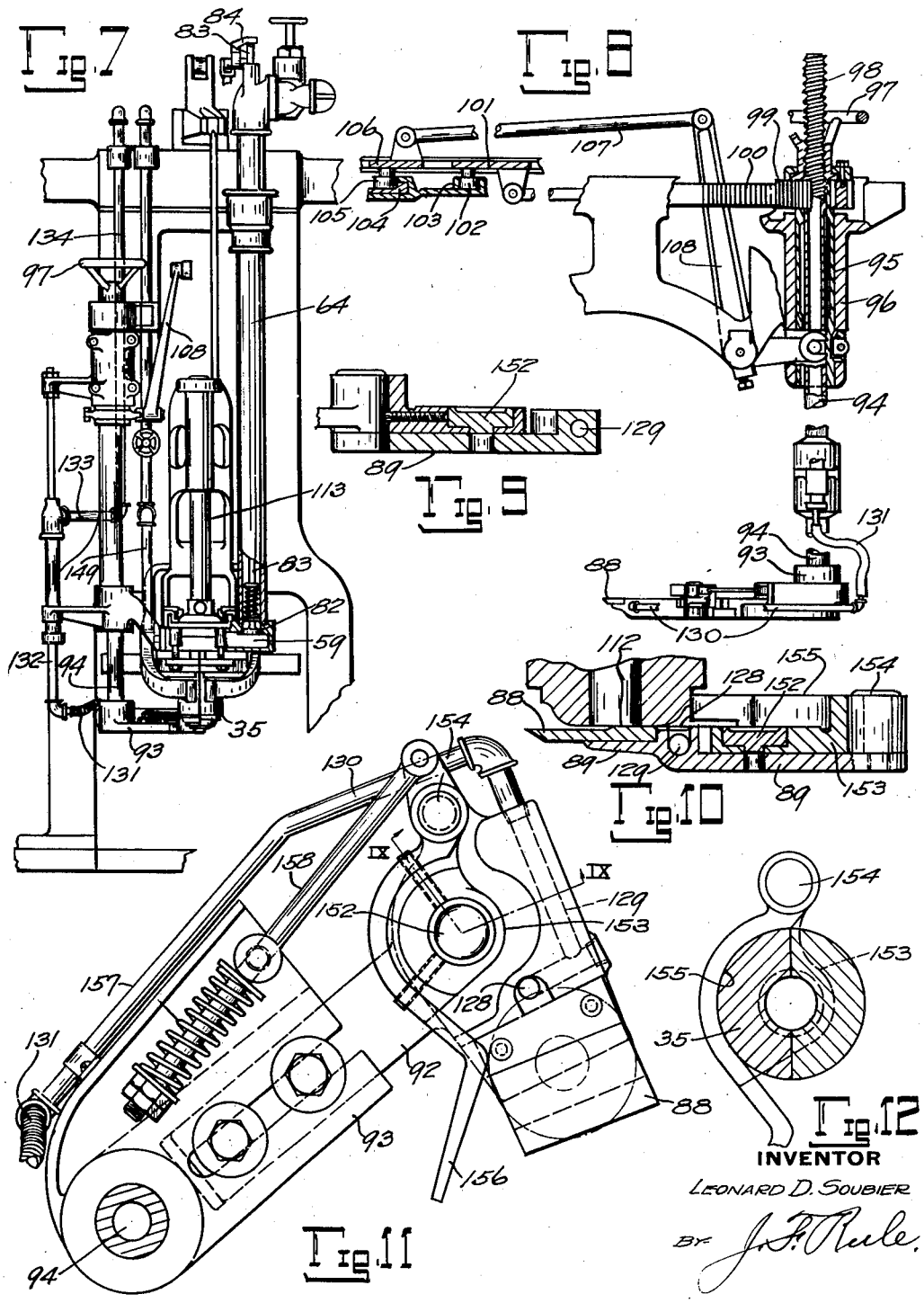

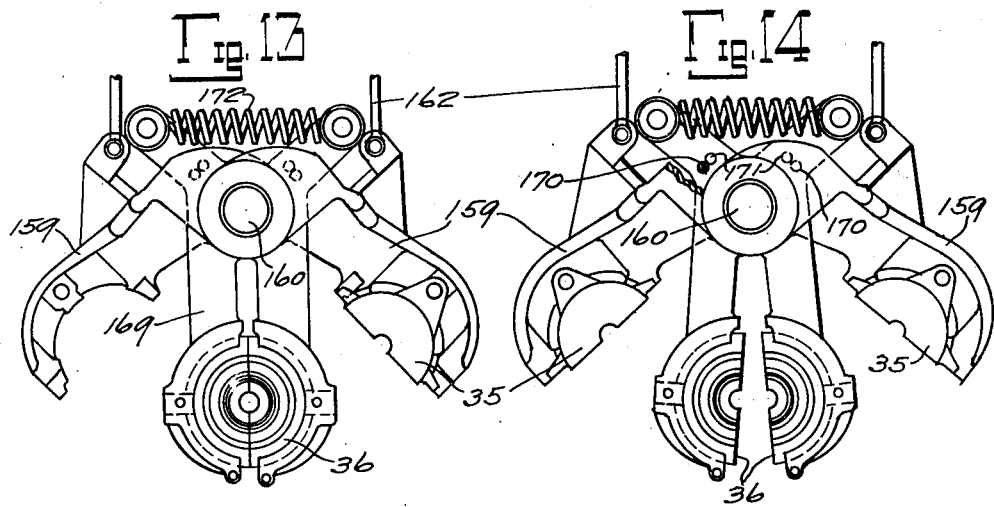
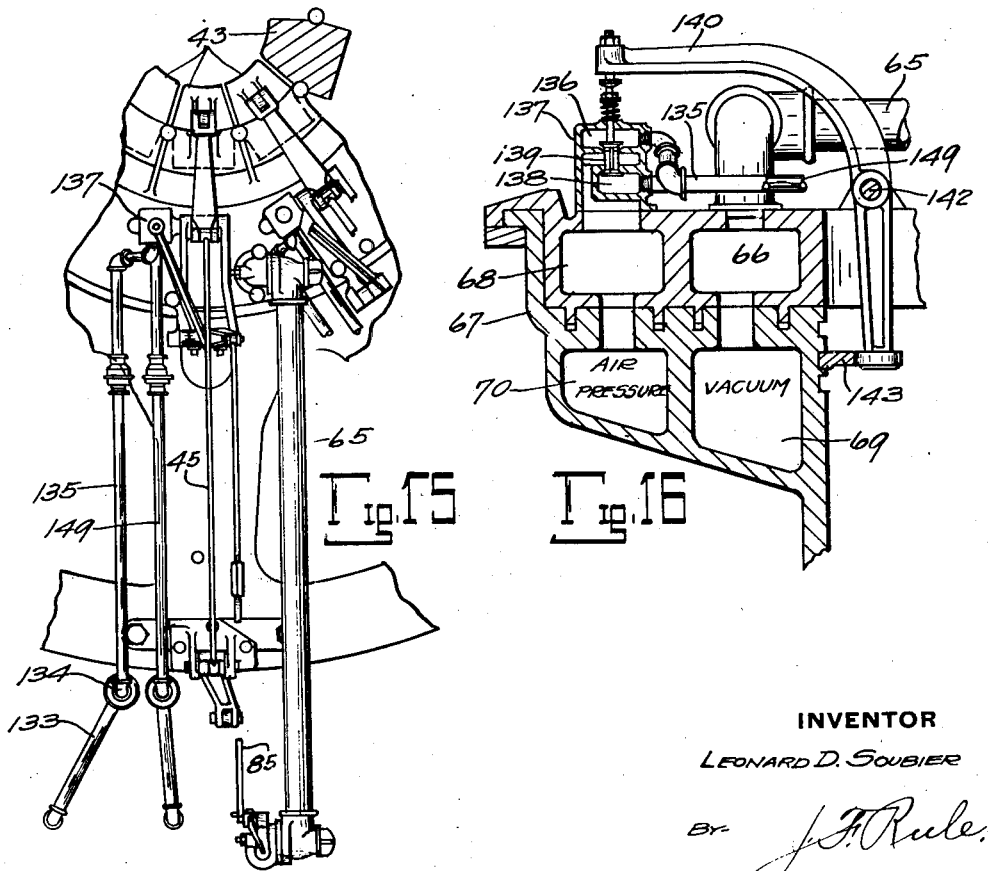

L. D. SOUBIER 1,607,651

GLASS BLOWING MACHINE

Filed Feb. 23, 1922  7 Sheets-Sheet 6

INVENTOR
LEONARD D. SOUBIER
BY J. F. Rule.
HIS ATTORNEY

Nov. 23, 1926.  
L. D. SOUBIER  
GLASS BLOWING MACHINE  
Filed Feb. 23, 1922   7 Sheets-Sheet 7  
1,607,651

INVENTOR  
LEONARD D. SOUBIER  
BY J. F. Rule  
HIS ATTORNEY

Patented Nov. 23, 1926.

1,607,651

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS-BLOWING MACHINE.

Application filed February 23, 1922. Serial No. 538,552.

My invention relates to machines for shaping glass and as herein shown is embodied in a machine in which the glass is gathered by suction and blown to finished form in the molds in which it is gathered.

In machines for making bottles or other hollow glass articles which are blown to hollow form in molds, it is customary to introduce the charge of glass in a blank mold in which the article is given a preliminary formation and then to transfer the charge to a finishing mold in which it is blown to its final form. In making bottles of medium or large size this method is entirely practical, but is not so well adapted to making bottles or similar articles of small size where it is desirable to blow the glass quite thin. The glass is necessarily chilled to a considerable extent in the blank mold to enable the blank to retain its shape while being transferred to the finishing mold and during such transfer is exposed to the air and subjected to further chilling. This requires a sufficient quantity of glass to be used so that when blown in the finishing mold the walls of the bottle or other article are comparatively thick and the article heavier than is desirable.

An object of the present invention is to overcome this difficulty and to enable small bottles or vials to be made with the walls thin and the weight of the articles as light as desired. In the attainment of this object the charges of glass are introduced into suitable molds and blown therein to their finished form without the necessity of transferring the partially formed article from one mold to another.

A further object of the invention is to provide a practical machine for gathering the glass by suction directly into the molds and blowing the glass in the gathering molds.

Other objects of the invention will appear hereinafter.

In the accompanying drawings:

Figure 1 is a part sectional elevation of a machine constructed in accordance with my invention.

Figures 2, 3 and 4 are views of the mold, plunger, blowing head and associated parts. Figure 2 shows the mold in gathering position with a charge of glass therein. Figure 3 shows the relation of parts after the charge has been severed and drawn upward in the mold. Figure 4 shows the bottle blown to hollow form in the mold.

Figure 5 is a detail showing a yielding connection between the plunger and its operating rack bar.

Figure 6 is a sectional view of the plunger, showing the air and vacuum passages.

Figure 7 is a fragmentary elevation showing a mold, cut-off mechanism, air and vacuum pipes, etc.

Figure 8 is a fragmentary part sectional elevation showing the cutter and mold bottom arm and actuating means therefor.

Figure 9 is a section taken at the line IX—IX on Figure 11.

Figure 10 is a sectional detail showing the relation of the cutter to the mold when the cutter is at an intermediate position.

Figure 11 is a plan view of the cutter arm and parts carried therewith.

Figure 12 is a sectional view showing the mold and mold bottom.

Figure 13 is a plan view of the neck mold, its carrying arms and the body mold carrying arms, the neck mold being closed.

Figure 14 is a similar view but with the neck mold open.

Figure 15 is a fragmentary top plan view of the machine.

Figure 16 is a fragmentary sectional elevation of the air and vacuum distributing head.

Figures 17, 18 and 19 illustrate mechanism for taking a bottle or other blown article after the body mold opens and withdrawing it to a position to clear the gathering tank as the mold carriage rotates, and discharging it after it has passed the tank. Figure 17 is a plan view of the gripping device projected and in engagement with the bottle. Figure 18 shows it withdrawn and passing the tank. Figure 19 is a sectional elevation of the mechanism.

Figure 20:
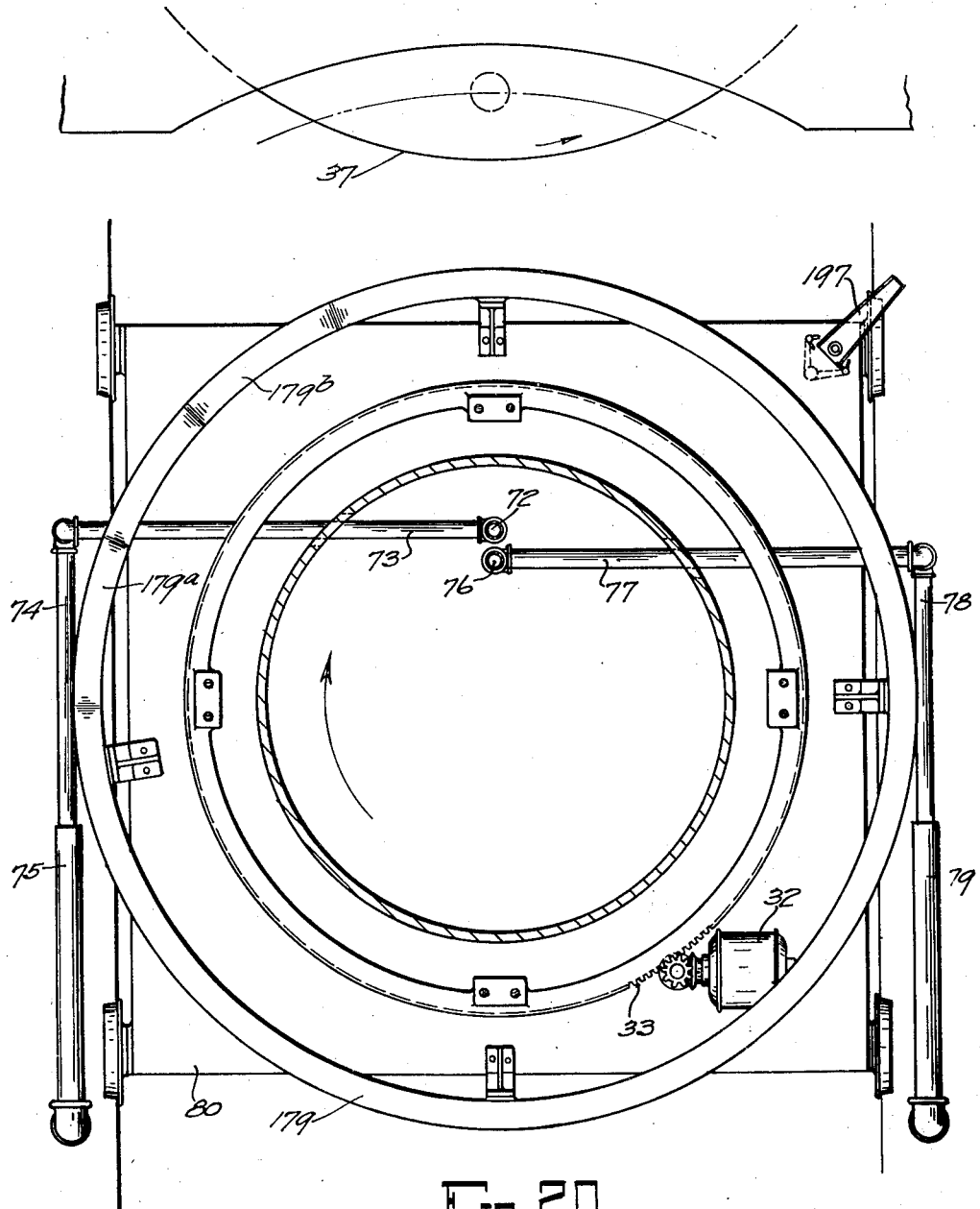

Figure 20 is a sectional plan view showing the cam track for lifting and lowering the carrier for the blown articles, and also showing air and vacuum pipe connections.

Figures 21 to 29 inclusive illustrate successive steps in the formation of a bottle.

Figure 21:
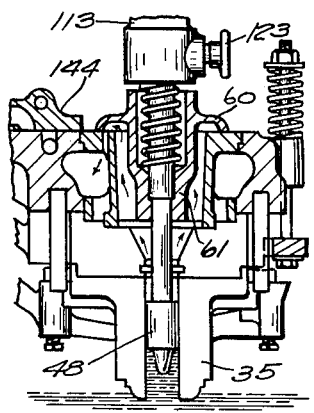

Figure 21 is a sectional view of the gathering head and shows the mold in gathering position and the charge of glass therein.

Figure 22:
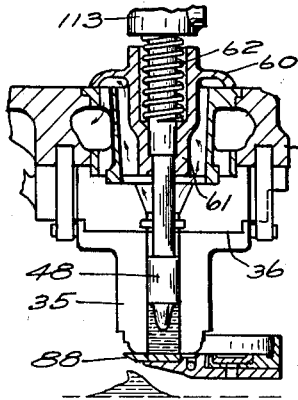

Figure 22 shows the mold lifted and the cutter at an intermediate position after having severed the glass.

Figure 23:
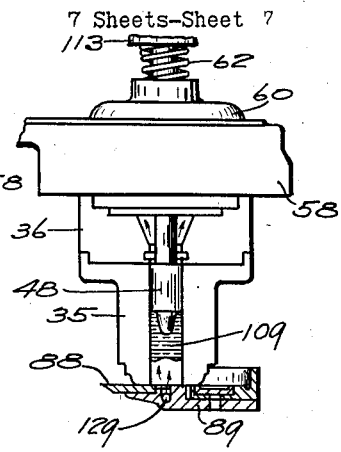

Figure 23 shows the cutter arm further advanced to a position to supply air pressure beneath the glass in the mold and the plunger at an intermediate position during its upward movement.

Figure 24:
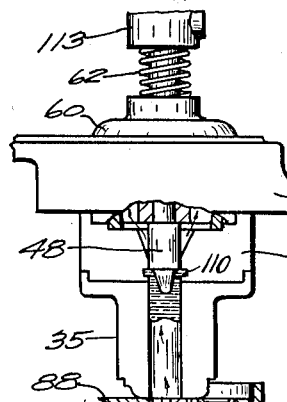

Figure 24 shows the cutter arm in the same position and the plunger at the highest position assumed before being withdrawn from the glass.

Figure 25:
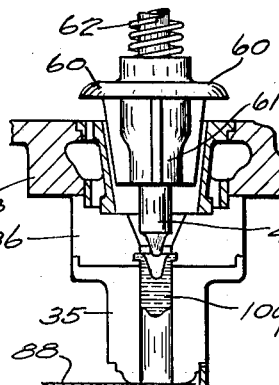

Figure 25 shows the cutter arm advanced to bring the mold bottom into position, and the plunger withdrawn from the glass.

Figure 26:
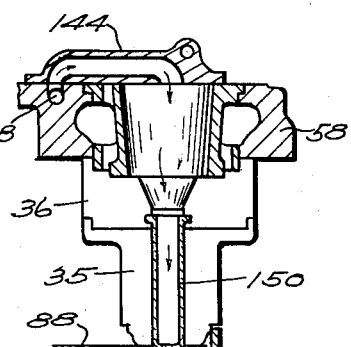

Figure 26 shows the blowing head after the plunger is entirely withdrawn, the blowing valve in posiion and the bottle blown.

Figures 27, 28:
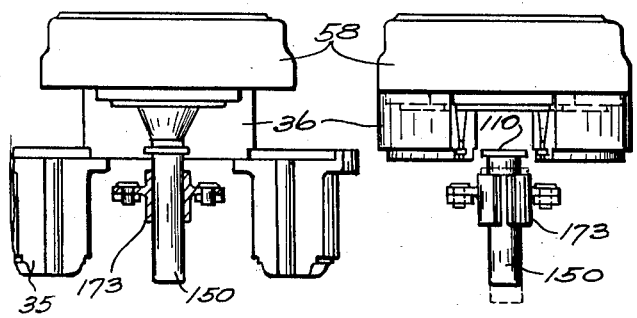

Figure 27 shows the body mold opened and the gripping arms engaging the bottle.

Figure 28 shows the neck mold opened and the bottle supported in said gripping arms.

Figure 29:
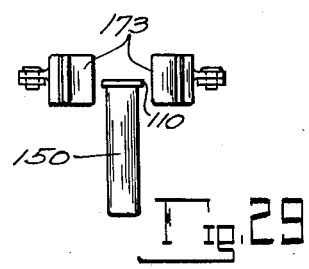

Figure 29 shows said arms opened to discharge the bottle.

The machine herein shown comprises various structural features employed in the well known Owens type of suction gathering machines, as shown for example in the patent to La France, No. 1,185,687, June 6, 1916, to which reference may be had for a full disclosure of such features of construction.

Referring particularly to Figure 1, the machine comprises a central stationary column 30 and a mold carriage 31 which rotates continuously about said column. The carriage is driven by a motor 32 having a driving connection with an annular gear 33 on the mold carriage. Mounted on the carriage to rotate therewith are a number of frames 34 arranged at intervals around the axis of the machine, each frame carrying a gathering mold and associated mechanism. Each complete mold comprises a sectional body mold 35 and a sectional neck or lip mold 36. As the carriage rotates the molds are brought successively over a gathering tank 37 containing molten glass 38. As a mold passes over the tank the frame 34 on which it is carried is lowered to cause the lower open end of the mold to dip into the glass for receiving its charge, as hereinafter explained. The lifting and lowering of the mold carrying frame is controlled by a stationary cam 39 on the column 30, on which cam runs a roll carried by a head 40 mounted for radial movement on the mold carriage and connected through a link with a bell crank 42 which in turn is connected to the frame 34 for moving the latter up and down. The weight of the frame 34 and parts carried thereby is counterbalanced by a counterweight 43 within the column 30, said counterweight being connected through a bell crank 44, link 45, bell crank 46 and link 47 with the frame 34.

The mold 35 has a vertical cylindrical cavity in which a plunger 48 is movable up and down. When the mold dips into the glass to receive its charge, the plunger is in its lowermost position, as shown in Figures 2, 21 and 22. The space between the plunger and the bottom of the mold provides a measuring cup, the capacity of which determines the quantity of glass permitted to enter the mold and, therefore, the weight or amount of glass in the finished article. With the mold in this position the air is exhausted from beneath the plunger so that the glass enters and fills this cavity. The plunger is made in sections having a screw threaded connection 51 (Fig. 3) permitting adjustment of the lower section up and down, whereby the amount of glass entering the mold can be regulated at will.

By reference to Figure 6, it will be seen that the plunger comprises a removable tip 49 having a stem 50 threaded into the body of the plunger. An annular passageway 52 surrounds said tip to permit the passage of air to and from a central bore 53 which opens into the larger passageway or channel 54 extending centrally along the plunger. The channel 54 opens through a lateral slot 55 into a central opening 56 in the neck mold, which opening is in register with a chamber 57 in a blowing head 58. The chamber 57 communicates with an annular chamber 59 in said head. A hood 60 having a bearing sleeve 61 slidably mounted on the plunger, seats on the blowing head 58, being held to its seat by a spring 62. This hood provides a passageway 63 between the chambers 57 and 59.

The vacuum passage extends from the chamber 59 through a vertical pipe 64 (Figs. 1 and 7) and horizontal pipe 65 to a vacuum chamber 66 formed in a distributing head 67. This distributing head is also provided with an air pressure chamber 68. The annular chambers 66 and 68 are formed in a section rotating with the mold carriage and communicate respectively with chambers 69 and 70 in a stationary section of the distributing head. The vacuum chamber 69 is connected through pipes 72, 73, 74 and 75 (see Fig. 20) with any suitable source of vacuum. The pressure chamber 70 is connected in like manner through pipes 76, 77, 78 and 79 with a source of air pressure. As shown in Figure 20, the pipes 74 and 78 have a telescoping connection with the pipes 75 and 79 to permit the machine to be moved toward and from the furnace on its truck 80.

The application of vacuum within the mold is controlled by a valve 82 at the lower end of the pipe 64 (Fig. 7). This valve has a stem 83 extending vertically through the pipe and actuated by a bell crank 84 (Fig. 1), connected through a link 85 with a lever 86 actuated by a stationary cam 87 on the center column 30. This cam is formed to open the valve when the mold is in gathering position.

After the mold has received its charge, as shown in Figure 2, and has been lifted away from the pool of glass, a knife 88 is projected across the bottom of the mold to sever the glass in the mold from the body of glass in the tank, as shown in Figure 22. The knife blade 88 is mounted on a supporting plate 89 provided with a stem 92 (Fig. 11), the latter being adjustably mounted in a bracket 93 attached to a vertical rock shaft 94. The bracket 93 and plate 89 together form a rock arm, herein referred to as the knife arm. The rock shaft 94 extends through a vertical sleeve 95 (Fig. 8) rotatably mounted in a bearing 96. The sleeve 95 is keyed to the rock shaft to rotate therewith, but permits vertical adjustment of the shaft therein. This vertical adjustment is effected by means of a hand wheel 97 having a threaded connection with the threaded end 98 of the rock shaft. A gear wheel 99 fixed to the sleeve 95 is rotated by a rack 100 connected to a slide block 101 mounted for radial sliding movement in the carriage, said block carrying a cam roll 102 running in a stationary cam 103. This cam operates through the connections just described to rock the shaft 94 and knife arm and parts carried thereby. A cam 104 operates to lift and lower the rock shaft 94 and parts carried thereby, through connections comprising a cam roll 105, slide block 106, link 107 and bell crank 108.

After the knife has moved across the bottom of the mold and severed the glass, the plunger is lifted to the intermediate position shown in Figure 3. The vacuum connections are maintained during this movement of the plunger. The hood 60, being slidably mounted on the plunger, is held to its seat by means of the spring 62. As the plunger moves upward the charge of glass 109 follows the plunger, owing to the atmospheric pressure entering through the bottom of the mold. It will be seen that in the Figure 3 position, the plunger has been entirely withdrawn from the body portion 35 of the mold, except the plunger tip, and that the lip mold is provided with an annular enlargement in which the glass enters to form a flange or lip 110. This constitutes the upper end of the vial or article which is to be blown.

In order to admit air through the bottom of the mold as the plunger moves upward from the Figure 2 position, the blade 88 has an offset portion 112 (Fig. 10) which is slightly higher than the cutting edge. As the knife advances, the cutting edge is in engagement with the bottom of the mold to make a clean cut, but as the cut is completed, the raised portion 112 striking the lower face of the mold moves the blade downward sufficiently to permit the free entrance of air, so that the glass may follow the plunger. This downward movment of the blade takes it out of contact with the glass immediately after the glass is severed, thereby reducing the chilling action of the blade to a minimum. The upward movement of the glass in the mold may also follow immediately after the severance of the glass. This separation of the cutter from the glass tends to eliminate the usual knife scar from the finished ware, first, by reducing the chilling action, second, by permitting any chilled portion of the glass to be re-heated or absorbed in the body of the charge, and, third, by preventing the formation of the bead or fringe of chilled glass between the knife blade and the periphery of the mold orifice, which is ordinarily formed when a downward air pressure is applied to the glass while the mold bottom is closed by the knife blade.

The plunger is moved up and down by means of a vertical rack bar 113 connected thereto and driven by a gear segment 114 connected through a link 115 to a slide block 116 operated by a cam 117.

The connection between the plunger 48 and rack bar 113 comprises a pin 118 (see Fig. 5) mounted in the rack bar and having its inner end projected into a groove or recess 119 formed in the plunger. A limited up and down movement of the plunger relative to the rack is thus permitted. As the rack moves upward from the Figure 2 position, the spring 62 which is under compression holds the plunger against the pin 118. In other words, the spring lifts the plunger as the rack is lifted by its pinion. The plunger is arrested in the Figure 3 position by a shoulder 120 (Fig. 6) thereon striking the bottom of the hood 60. After the plunger is arrested, the rack 113 is permitted a slight additional upward movement without lifting the hood 60, owing to the lost motion connection between the pin 118 and the rack bar. This construction permits the plunger to be stopped in the exact position desired independent of any inaccuracies in its operating cam or lost motion in the connections between said cam and the plunger. The connecting pin 118 is held in position by a spring 122 but may be withdrawn to permit disconnection of the rack and plunger. To permit the pin to be withdrawn it is turned by means of a handle 123 into position to bring a holding lug 124 opposite a slot 125 formed in a holding flange 126. The downward movement of the plunger is limited by a shoulder 127 thereon (Figs. 2 and 3) coming in contact with the floor of the sleeve 61.

As the knife arm continues to advance it is brought to the Figure 23 position in which it seals the lower end of the mold and also brings the mold cavity into communication with air pressure. The air connections may be traced from the mold through a port 128, (Figs. 10 and 11), channel 129 extending through the plate 89, pipe 130, flexible hose 131, and pipes 132, 133, 134 and 135 to a chamber 136 (Fig. 16) in a valve box 137. This chamber and an air chamber 138 also contained in the box 137 are brought alternatively into communication with the chamber 68 by means of a valve 139. This valve is operated by a lever 140 fulcrumed at 142 and actuated by a cam 143. With the valve in the Figure 16 position, air under pressure is transmitted from the pressure chamber 68 through the connections just described to the mold cavity. This air pressure may be admitted to the mold during the upward movement of the plunger shown in Figure 23, and continued until after the plunger has been brought to rest in the position shown in Figures 3 and 24. This air pressure supplements the suctional action heretofore described and thus assists in causing the glass to follow the plunger upward and in forming the upper end of the bottle.

After the operation just described, the plunger is entirely withdrawn from the mold, carrying with it the hood 60 (see Figs. 4 and 25). As the plunger clears the blowing head 58, a horizontally sliding valve 144 is moved over the chamber 57 and connects said chamber with the air pressure. This movement of the valve is produced by a cam 145 formed in the gear segment 114, said cam operating through a lever 146 and link 147. The air pressure connections extend from the chamber 57 through valve 144, channel 148 in the blow head, and pipe connections 149 to the chamber 138 (Fig. 16). The valve 139 is now lowered to open communication between chamber 138 and the pressure chamber 68 so that air pressure is supplied to the mold and operates to blow the bottle 150 to its finished form.

Before the bottle is blown, however, the knife arm has been advanced to bring a mold bottom 152 beneath the mold. This mold bottom is removably supported in a centering plate 153 supported on the plate 89 and arranged to swing about a pivot 154. The plate 153 has a side wall 155 curved to conform to the shape of the mold, said wall having an extension 156. As the cutter advances, the mold strikes the arm 156 and cams it to one side, permitting said arm to pass the mold and then swing inward to the Figure 12 position in which the mold is centered over the bottom plate 152. The centering plate 153 is held in position against the mold by means of a spring 157 operating through a rod 158 connected to an arm on said plate. The centering wall 155 is preferably shaped to engage only one of the mold sections, as shown in Figure 12.

After the mold bottom has been moved into position and the bottle blown, the knife arm is moved vertically downward a short distance and then swung to one side by lowering and rotating the shaft 94 through the mechanism shown in Figure 8. The mold sections 35 are then separated, leaving the bottle supported in the lip mold. The mold sections 35 are carried on arms 159 (Figs. 13 and 14) mounted on a pivot pin 160 supported in the dipping frame 34. The arms 159 have operating connections including links 162 with a slide block 163 slidable in guideways 164 on the frame 34, said block 163 being connected through a link 166 with a slide block 167 actuated by a stationary cam 168.

The lip mold sections 36 are carried on arms 169, also fulcrumed on the pin 160. The lip mold sections are separated to release the bottle, by means of pins 170 on the arms 159 which engage pins 171 on the arms 169 during the final opening movement of the body mold, and thereby open the lip mold, as shown in Figure 14. The bottle is thus released from the mold.

This release of the bottle takes place before the mold is again brought around to the gathering tank. The mold is then closed preparatory to gathering the next charge of glass. The lip mold is closed by a spring 172 during the initial closing movement of the arms 159.

The bottle when released from the lip mold may be removed from the machine, but it is sometimes desirable to carry the bottle or other blown article to a position beyond the gathering tank before it is discharged from the machine. This is particularly desirable where the machine is to be used in any of the numerous installations equipped with the Owens type of bottle machines, which installations are provided with automatic mechanism for receiving bottles discharged at a point beyond the gathering tank and conveying them to the leer. It is also sometimes desirable to carry the bottles or other articles on the mold carriage after they are released from the forming molds, to permit them to cool sufficiently to retain their shape when discharged from the machine, particularly articles of considerable size which do not set so quickly in the molds. I have provided carrying mechanism for the above purposes, which will now be described.

Referring particularly to Figures 17, 18 and 19, the carrying mechanism for receiving the blown bottle and carrying it to the discharging position, comprises a pair of gripping or holding jaws 173 carried on arms 174 mounted on a pivot pin 175 on a frame 176 mounted to slide radially of the machine in guides 177. These guides are carried by a frame 178 which rotates with the mold carriage but is movable up and down relatively thereto. This frame is supported on a stationary cam track 179 on which runs a roll 180 carried by a stem 182 adjustably mounted in the frame 178. The frame 176 carrying the gripping arms is provided with a rack 183 driven by a gear segment 184 carried by a rock shaft 185 to which is connected a rock arm 186 carrying a roll 187 running on a stationary cam 188. The frame 176 is provided with guides 189 in which reciprocates a plate 190 connected through links 192 to the gripper arms 174. The gripping jaws are opened by means of a stationary cam 193 operating through a rod 194 extending through a bearing lug 195 and connected at its outer end to the plate 190. When the rod 194 is moved outward by its cam it moves the gripping jaws to gripping position. A spring 196 tends to move the rod inward for separating the gripping jaws. A spring 191 provides a yieldable connection between the gripping jaws and their operating cam.

In the operation of the bottle carrier just described, the frame 178 is lifted by the cam 179 at about the position 179ª (Fig. 20) as the body mold 35 opens, thereby bringing the holding jaws up even with the body of the bottle. The frame 176 is projected by the cam 188, and the cam 193 operates to close the jaws 173 around the bottle. The lip mold now opens, so that the bottle is supported in the holding jaws 173. The jaws may be so adjusted that they will not grip the bottle, but permit it to drop as shown in Figure 28, from the full line to the broken line position, in which the lip 110 rests on the holding jaws. As the frame 178 approaches the gathering tank it is lowered by the cam 179 at the point 179ᵇ (Fig. 20). The frame 176 carrying the gripper is also withdrawn radially inward, thereby carrying the bottle towards the center of the machine into position to clear the tank 37. After passing the tank, the frame 176 is moved outward and the gripping jaws are opened to release the bottle which drops onto a chute 197 (Fig. 20) which may deliver the bottle to a conveyor on which it is carried into the leer. The outward movement of the frame 176 may take place any time after passing the tank, either before or after the bottle is discharged.

The operation may be summarized as follows:

The mold carriage rotates continuously and brings the molds successively over the gathering tank 37. As each mold passes over the tank, its carrying frame 34 is lowered through the operation of the cam 39 to bring the mold into gathering position (Figs. 1, 2 and 21). The plunger 48 is at this time in its lowermost position and determines the size of the measuring chamber into which the charge of glass is gathered by suction. The air is exhausted through the passageways extending through the plunger (Fig. 6) to chamber 59 (Figs. 2 and 7), past the open valve 82 and thence to the vacuum chamber 66 (Fig. 16) in the distributing head. When a charge of glass has thus been drawn up to fill the measuring chamber formed by the lower portion of the mold, the latter is lifted and the knife arm advanced to sever the glass (Fig. 22). The plunger is now drawn upward out of the body mold to the position shown in Figures 3 and 24. The glass moves upward with the plunger owing to the vacuum being maintained at this time. This upward movement of the glass may be assisted by air pressure, as indicated in Figures 23 and 24, admitted through the port 128 (Figs. 10 and 11) in the cutter arm, the supply of air being controlled by the valve 139 (Fig. 16). The combined action of the suction and air pressure applied at the upper and lower ends of the charge respectively, forms the lip 110 of the vial in the lip mold 36. The plunger is now entirely withdrawn from the mold and blowing head (Fig. 4) and the mold bottom 152 brought into register with the mold by a continued movement of the knife arm. At the same time the valve 144 slides over the blow head beneath the plunger, completing the air connections for blowing the bottle. The valve 139 (Fig. 16) is at this time lowered to permit air pressure to the valve chamber 138 and thence through the pipe connections to the blowing head 58. The vial is, therefore, blown to its finished form (Fig. 4). The cutter plate now moves vertically downward a short distance and is then swung laterally to clear the mold, these movements being effected by the mechanism shown in Figure 8. The body mold 35 now opens, leaving the vial suspended from the lip mold. As the body mold opens, the holder (Figs. 17 to 19) is lifted to bring the holding jaws 173 upward to the plane of the vial, the holder being then projected and the gripper arms 173 closed around the vial. The lip mold now opens and the holder with the vial therein is lowered and drawn radially inward to clear the gathering tank. The bottle remains in the holder until it reaches discharging position opposite the chute 197 (Fig. 20) when the gripper is opened and drops the bottle on said chute. The opening of the mold to release the bottle takes place shortly before it reaches the gathering tank, the mold being again closed ready for the next gather by the time it is over the tank. The molds may be cooled by permitting air to the blowing head after the bottle is discharged from the mold, or by the use of a ribbed or otherwise especially constructed mold.

Modifications may be resorted to within the spirit and scope of my invention.

What I claim is:

1. In a glass forming machine, the combination of a mold open at its lower end to receive a charge of glass, means to introduce the glass through said open end, a plunger projecting downward into the mold, means to move said plunger upward after the glass is in the mold and thereby increase the capacity of the mold, and means to introduce air under pressure through the upper end of the mold and thereby blow the glass.

2. In a glass forming machine, the combination of a mold open at its lower end to receive a charge of glass, means to introduce the glass through said open end, a plunger projecting downward into the mold, means to move said plunger upward after the glass is in the mold and thereby increase the capacity of the mold, a mold bottom movable into position to close the lower end of the mold, and means to blow air through the upper end of the mold and expand the glass therein.

3. In a glass forming machine, the combination of a mold open at its lower end to receive a charge of glass, means to introduce the glass through said open end, a plunger projecting downward into the mold, means to move said plunger upward after the glass is in the mold and thereby increase the capacity of the mold, said plunger shaped to form an initial blow opening in the glass, and means to blow the glass and expand it in the mold.

4. The combination of a mold open at its lower end, means to introduce a charge of glass through said end, a plunger projecting downward into the mold, means to move the plunger upward to an intermediate position after the charge has been introduced into the mold, the mold being shaped to conform to the shape of a finished article when the plunger is in said intermediate position, means to cause a differential upward pressure on the glass by which it is moved upward in the mold, means to withdraw the plunger from the mold, and means to blow the glass in the mold.

5. In a glass forming machine, the combination of a mold open at one end to receive a charge of glass, a plunger projecting into the mold from the opposite end, means to fill the mold between the plunger and said open end with glass, said plunger having a tip shaped to form an initial blow opening in the glass, means to increase the effective capacity of the mold, means to apply a differential pressure at opposite ends of the glass in the mold and thereby cause the glass to conform to the shape of the plunger tip, means to withdraw the plunger, and means to blow the glass to finished form while in the mold.

6. In a glass forming machine, the combination of a mold open at one end to receive a charge of glass, a plunger projecting into the mold from the opposite end and shaped to form an initial blow opening in the glass, means to move the plunger away from the charge receiving end, means to apply differential pneumatic pressure to the glass during said movement of the plunger and thereby cause the glass to follow the plunger, and means to blow the glass in the mold.

7. In a glass forming machine, the combination of a mold open at one end to receive a charge of glass, a plunger projecting into the mold from the opposite end and shaped to form an initial blow opening in the glass, means to move the plunger away from the charge receiving end, means to cause the glass to follow the plunger, and means to remove the plunger and blow the glass to hollow form in the mold.

8. In a glass forming machine, the combination of a mold open at one end to receive a charge of glass, a plunger projecting into the mold from the opposite end and shaped to form an initial blow opening in the glass, means to move the plunger away from the charge receiving end, means to apply air pressure to the glass at the charge receiving end of the mold and thereby cause the glass to follow the plunger, a mold bottom to close the charge receiving end of the mold, and means to blow the glass in the mold.

9. The method which consists in introducing a measured quantity of molten glass into a mold through an open end thereof and simultaneously forming a blow opening in the end of the charge remote from said end of the mold, moving the charge bodily in the mold away from said end, closing said end and expanding the glass to hollow form in the mold by air pressure applied through said blow opening.

10. The method which consists in drawing a measured quantity of glass by suction into the open end of a mold, severing the glass, moving the charge of glass bodily away from said end to provide a space between the glass and said end, and expanding the glass to hollow form within said space.

11. The method of forming a bottle or vial which consists in drawing a measured quantity of molten glass by suction into a mold at one end thereof, moving the glass bodily toward the other end of the mold and forming the open end of the bottle by pressure applied through said charging end of the mold, and blowing the bottle to hollow form in the mold by air pressure applied through said open end thereof.

12. In a glass forming machine, the combination of a mold open at its lower end, means to immerse said end in a pool of molten glass and gather a measured quantity of glass in the mold by suction, means to reduce the capacity of the mold during the gather and then increase the capacity to permit the glass to expand to hollow form in the mold, means to sever the glass, and means to blow the glass to hollow finished form in the mold by air pressure applied through the opposite end of the mold from that through which the glass is gathered.

13. In a glass forming machine, the combination of a vertical mold, means to draw a measured quantity of glass by suction into the mold, automatic means to limit the amount of glass drawn to a quantity of much smaller volume than the mold cavity, and means to blow the glass to a hollow form in the mold without inverting the mold.

14. In a glass forming machine, the combination of a gathering mold, means to gather a measured charge of glass by suction into the mold, means to sever the glass, means to move the severed glass in one direction in the mold, and means to blow the glass in the opposite direction to hollow form in the mold.

15. In a glass forming machine, the combination of a mold open at its lower end, means to dip said end into a pool of molten glass and gather a measured charge of glass by suction, a mold capacity reducing device in the mold during the gather, means to sever the charge, a mold bottom movable into position to close the charge receiving end of the mold, means to withdraw said reducing device, and means to supply air pressure through the opposite end of the mold and expand the glass in the space provided by the withdrawal of said reducing device.

16. In a glass forming machine, the combination of a mold open at its lower end, means to dip said end into a pool of molten glass and gather a measured charge of glass by suction, means to sever the charge, a mold bottom movable into position to close the charge receiving end of the mold, a plunger extending downward into the mold cavity and greatly reducing the effective capacity of the mold during the gather, said plunger comprising a tip shaped to form an initial blow opening in the glass, means for withdrawing the plunger, and means to blow through said blow opening and cause the glass in the mold to expand into the space provided by the withdrawal of the plunger.

17. In a glass forming machine, the combination of a mold open at its lower end to receive a charge, means to dip said end in a pool of molten glass, means to gather the glass by suction in the mold, a plunger projecting downward into the mold, a cutter to sever the glass, means to draw the plunger upward, means to cause the charge of glass to move upward with the plunger, and means to supply air pressure through the upper end of the mold and blow the glass to hollow form in the mold.

18. In a glass forming machine, the combination of a mold open at its lower end to receive a charge, means to dip said end in a pool of molten glass, means to gather the glass by suction in the mold, a plunger projecting downward into the mold, a cutter to sever the glass, means to draw the plunger upward, means to cause the charge of glass to move upward with the plunger, said plunger shaped to form an initial blow opening in the glass, means to withdraw the plunger from the glass, and means to blow the glass in the mold.

19. In a glass forming machine, the combination of a mold open at its lower end to receive a charge, means to dip said end in a pool of molten glass and gather a measured charge of glass by suction, means to reduce the effective capacity of the mold during the gather, a cutter blade, a carrier for said blade, means to move said carrier transversely of the mold and sever the gathered glass, a mold bottom on said carrier movable into position to close the charging end of the mold, means to increase the capacity of the mold, and means to blow the glass to hollow form in the mold by air pressure applied through the upper end of the mold while the mold bottom is in said mold closing position.

20. In a glass forming machine, the combination of a mold open at its lower end to receive a charge, means to dip said end in a pool of molten glass and gather a measured charge of glass by suction, a cutter blade, a carrier for said blade, means to move said carrier transversely of the mold and sever the gathered glass, a mold bottom on said carrier movable into position to close the charging end of the mold, a plunger projecting into the mold at the end thereof opposite said charge receiving end and shaped to form an initial blow opening in the glass, means to withdraw the plunger, and means to blow the glass in the mold while the mold bottom is in said closing position.

21. In a glass forming machine, the combination of a mold open at its lower end to receive a charge, means to dip said end in a pool of molten glass and gather a measured charge of glass by suction, a cutter blade, a carrier for said blade, means to move said carrier transversely of the mold and sever the gathered glass, a mold bottom on said carrier movable into position to close the charging end of the mold, a plunger projecting downward into the mold, means to withdraw the plunger, means to cause the charge of glass to follow the plunger, and means to blow the glass to hollow form in the mold.

22. In a glass forming machine, the combination of a mold open at one end to receive a charge of glass, a cutter, a carrier on which the cutter is mounted, means to move said carrier transversely of the mold and cause the cutter to move across said end and sever the glass, a mold bottom on said carrier separate from said cutter and brought into position to close said end by said movement of the carrier, and means to blow the glass to hollow form in the mold while the mold bottom is in said closing position.

23. In a glass forming machine, the combination of a mold, a cutter, a carrier on which the cutter is mounted, means to move said carrier transversely of the mold and cause the cutter to sever the glass, a mold bottom removably mounted on said carrier and brought into mold closing position by said movement of the carrier, and means to blow the glass to hollow form in the mold while the mold bottom is in said mold closing position.

24. In a glass forming machine, the combination of a mold, a cutter, a carrier on which the cutter is mounted, means to move said carrier transversely of the mold and cause the cutter to sever the glass, a mold bottom removably mounted on said carrier and brought into mold closing position by said movement of the carrier, means on said carrier to limit the movement of the mold bottom and hold it in register with the mold, and means to blow the glass to hollow form in the mold by air supplied through the end of the mold opposite said mold bottom.

25. The combination of a mold open at one end to receive a charge of glass, a laterally swinging arm, a cutter and mold bottom thereon, means carried by said arm to center the mold bottom with respect to the mold cavity with said bottom in position to close said open end, and means to blow the glass to hollow form in the mold while the mold bottom is in said position.

26. The combination of a mold, a laterally swinging arm, a mold bottom carrier pivotally mounted on said arm, a mold bottom thereon, means to swing said arm and bring the mold bottom beneath the mold, and a centering device connected to said carrier and operative to engage the mold and hold said bottom in register with the mold.

27. In a glass forming machine, the combination of a mold open at one end to receive a charge of glass, a mold closing device movable transversely of the main axis of the mold across said open end into position to form a closure for the mold, said device having an air port opening into the mold, and means to supply air under pressure through said port while the mold closing device is in said position.

28. In a glass forming machine, the combination of a suction gathering mold, a cutter movable across the end of the mold to sever the glass, means moving with the cutter to form a closure for the mold, said closure having an air passage opening into the mold, means to supply air pressure through said passage to the interior of the mold, and means to blow the glass to hollow form in the mold by air supplied through the opposite end of the mold.

29. In a glass gathering machine, the combination of a mold, means to gather a charge of glass by suction through the lower end of the mold, means to move the charge bodily upward and compact it in the mold by air pressure applied in the mold beneath the charge, means to form an initial blow opening in the upper end of the charge, and means to expand the glass downward by air pressure applied through said blow opening.

30. In a glass forming machine, the combination of a body mold having a cylindrical mold cavity, a lip mold in register therewith and having a cavity of the same diameter as that of the body mold, said lip mold cavity comprising an annular enlargement to form a lip or flange at the mouth of the article formed in said molds, means to introduce a charge of glass into said molds while in said registered position and cause the glass to take the shape of the lip mold, and means to then blow the glass to hollow form in the body mold.

31. In a glass forming machine, the combination of a sectional body mold, a sectional auxiliary mold in register with the body mold, said molds together providing a cylindrical mold cavity terminating in an annular enlargement within the auxiliary mold, said cavity being of uniform diameter throughout, except at said enlargement, means to introduce a charge of glass into said molds while in said registered position and cause the glass to take the shape of the auxiliary mold, and means to then blow the glass to hollow form in the body mold.

32. In a glass forming machine, the combination of a lip mold, a body mold in register therewith, and a plunger movable through the lip mold into position to extend within the body mold, said plunger having substantially the same diameter as the body mold cavity.

33. In a glass forming machine, the combination of a body mold, a lip mold, a plunger movable through the lip mold into the body mold, means to introduce a charge of glass through the opposite end of the body mold, means to withdraw the plunger into a position to form a closure for the lip mold, means to cause the glass to follow the plunger as it is withdrawn to said position, and means to blow the glass in the mold.

34. In a glass forming machine, the combination of a mold, a plunger, a plunger operating rod, means operating through said rod to move the plunger toward and from the mold, said plunger comprising a stop to limit said movement toward the mold, and means providing a lost motion connection between the rod and plunger.

35. In a glass forming machine, the combination of a mold, a plunger movable toward and from the mold, a blowing head, and a valve stationary during a portion of the plunger movement to control air passages leading to the mold and movable by the plunger during another portion of its movement.

36. In a glass forming machine, the combination of a mold, a plunger movable toward and from the mold, a blowing head, a valve stationary during a portion of the plunger movement to control air passages leading to the mold and movable by the plunger during another portion of its movement, a second valve, and means operated by said last mentioned movement of the plunger to move said second valve to position to control said air passages.

37. A glass forming machine comprising in combination a mold carriage rotatable about a vertical axis, a mold thereon, means to introduce a charge of glass when the mold is at a predetermined point in its path of revolution, means cooperating with the mold to give the glass therein the finished form in which it is discharged from the machine, and a carrier to receive the formed article before the mold has completed its revolution and thereby permit the mold to receive its next charge when it again reaches said charging point, said carrier operable to carry the article beyond said charging point and discharge it from the machine.

38. A glass forming machine comprising, in combination, a mold carriage rotatable about a vertical axis, a mold thereon, means to introduce a charge of glass into the mold at a predetermined position, means co-operating with the mold to shape an article to the finished form in which it is finally discharged from the machine and discharge it from the mold before the mold again reaches the charging position, and means on the carriage to receive said article and carry it with the mold to a point beyond the charging position and discharge it from the machine.

39. A glass forming machine comprising the combination of a rotary mold carriage, a mold thereon, a gathering tank over which the mold is carried by the rotation of the carriage, means for causing the mold to gather a charge of glass by suction from the tank, means co-operating with the mold to shape the glass to an article of the finished form in which it is finally discharged from the machine and discharge it from the mold before the mold again reaches the tank, and a carrier to receive said article, carry it past the tank and discharge it in said finished form at a point beyond the tank.

40. The combination of a rotary mold carriage, a mold thereon, a gathering tank over which the mold is carried by the rotation of the carriage, means for causing the mold to gather a charge of glass by suction from the tank, means co-operating with the mold to shape the glass to an article of finished form and discharge it before the mold again reaches the tank, a carrier comprising a holding device to engage and hold the finished article, and automatic means to move said device inward radially of the carriage to clear the tank and to project said device to discharging position after it has passed the tank.

41. In a glass forming machine, the combination of a mold carriage rotatable about a vertical axis, an end mold and a body mold on the carriage, means to blow a parison in the molds to the finished form in which it is finally discharged from the machine, means to open the body mold and leave the finished article suspended from the end mold, a carrier, means to bring it into position to hold said article, means to then open the end mold leaving the finished article supported by said carrier and cause it to be carried therewith during a predetermined movement of the mold carriage, and means to then discharge the article from said carrier in the same form in which it was received by the carrier.

42. In a glass forming machine, the combination of a rotating mold carriage, a mold thereon in which an article is given its finished form during each rotation of the carriage, and a carrier to which the article is transferred and by which it is supported while the mold receives its succeeding charge, said carrier mounted on and rotating with the mold carriage and operable to discharge the article in the same form in which it was received from the mold.

43. In a glass forming machine, the combination of a rotating mold carriage, a mold in which an article is given its finished form, a carrier mounted on the carriage and comprising holding jaws, and means to operate said jaws to engage and hold the finished article that has been formed in the mold, said carrier arranged to travel with the mold through a predetermined distance and then release said article in the same form in which it was received from the mold.

44. In a glass forming machine, the combination of a rotary mold carriage, means thereon for receiving and shaping charges of glass to form finished articles, and carriers on said carriage each comprising a pair of grippers to receive and hold one of said articles, carry it during a predetermined movement of the mold carriage and discharge it from the machine in the same form in which it was received by said grippers.

45. In a glass forming machine, the combination of a rotary mold carriage, means thereon for receiving and shaping charges of glass to form finished articles, carriers on said carriage each comprising a pair of grippers to receive and hold one of said articles, means to project said grippers radially of the carriage, and means to move them bodily up and down.

46. The combination of a rotary mold carriage, a gathering tank, suction gathering molds on the carriage, end molds, means co-operating with the molds to blow the glass to the form of finished articles and suspend said articles from the end molds, article carriers on the carriage, each comprising a pair of article holding jaws, a stationary cam, means operated by the movement of the carriage to cause said cam to project said jaws and cause them to engage an article suspended from the end mold, and a stationary cam track on which the carrier is supported and by which it is moved up and down as the carriage travels.

47. In a glass forming machine, the combination of a mold open at one end, means to introduce a charge of glass through said end, means to form with the mold a measuring cup, adjusting means to vary the capacity of said cup, and means to blow the glass to hollow form within said mold.

48. In a glass forming machine, the combination of a mold, means to introduce a charge of glass into the mold, a plunger, means to move the plunger into operative relation to the mold and form therewith a measuring cup by which the volume of the charge is determined, and means to adjust said plunger with respect to the mold and thereby vary the volume of the charge.

49. In a glass forming machine, the combination of a neck mold, a body mold in register therewith, means to supply a charge of glass to the body mold, and adjustable means co-operating with the mold to vary the weight of the charge.

50. In a glass forming machine, the combination of a suction gathering mold open at its lower end to receive a charge, means to bring said end into contact with a pool of glass and gather a charge by suction, the opening in said lower end of the mold being substantially the diameter of the body portion of the mold cavity, means to limit the volume of the charge to an amount much smaller than the mold cavity to permit the glass to be blown to hollow form in the mold, means to sever the charge, and means to blow it to finished hollow form within said mold.

51. In a glass forming machine, the combination of a mold open at its lower end, means to bring said end into contact with a pool of molten glass, means to draw a charge of glass by suction into the mold, means to limit the volume of the charge to an amount much less than the capacity of the mold, a cutter to sever the charge from the glass in the pool, means to form an initial blow opening in the portion of the glass first entering the mold, and means to blow the glass to hollow form within the mold.

52. In a glass forming machine, the combination of a mold open at its lower end, means to bring said end into contact with a pool of molten glass, means to draw a charge of glass by suction into the mold, a cutter to sever the charge from the glass in the pool, means to form an initial blow opening in the portion of the glass first entering the mold, means to cause the severed charge to move upward in the mold, a mold bottom movable into position to close the lower end of the mold, and means to apply air pressure at said blow opening and blow the charge to hollow form in the space between the mold bottom and the bottom of the charge.

53. In a glass forming machine, the combination of a mold, means to bring it in contact with molten glass, means to exhaust the air from the mold and thereby charge the mold, a cutter blade operable to sever the glass at the charge receiving end of the mold, means to cause a separation of the cutter and severed glass immediately after the severance, means to move the glass away from said end of the mold, and means to apply air pressure at said end of the mold.

54. In a glass forming machine, the combination of a mold, means to bring it in contact with molten glass, means to exhaust the air from the mold and thereby charge the mold, a cutter blade operable to sever the glass at the charge receiving end of the mold, means to immediately separate the cutter from the severed glass and apply air pressure to the glass at said end of the mold, and means to blow the glass to hollow form by air pressure applied at the opposite end of the mold.

55. In a glass forming machine, the combination of a mold, means to bring it in contact with molten glass, means to exhaust the air from the mold and thereby charge the mold, a cutter blade operable to sever the glass at the charge receiving end of the mold, means to immediately separate the cutter from the severed glass and apply air pressure to the glass and move it away from said end, a mold bottom, means to bring it into position at said end of the mold, and means to blow the glass in the mold.

56. The method which consists in gathering a charge of glass by suction into a mold through an open end thereof, severing the glass at said end by a mechanical shear, moving the glass away from said end, applying a mold bottom to said end, and blowing the glass to hollow form in the mold.

57. In a glass forming machine, the combination of a mold, means to introduce a charge of glass into the mold and partially form an open ended blank therein by giving a predetermined initial hollow form to said end, means to then bodily move the charge to a different part of the mold and complete the formation of the open end of the blank, and means to blow the blank to hollow form.

58. In a glass forming machine, the combination of a mold, means to introduce a charge of glass into the mold and form it into an open ended blank in one end of the mold, means to then move the blank to the opposite end of the mold and complete the formation of the open end of the blank, and means to then blow the blank in the mold.

59. In a glass forming machine, the combination of a mold open at one end to receive a charge and shaped at its opposite end to form the open or neck end of an article, means to introduce a charge at said receiving end and shape it into a blank with an initial blow opening, means to then move the blank bodily away from said receiving end to said neck forming end and form the neck of the article, and means to then blow the article.

60. The method of forming a bottle or other hollow glass article which consists in introducing a charge of molten glass into a mold and forming a blow opening in one end of the glass, shifting the glass bodily to another part of the mold and forming the neck end thereof, and then blowing the glass to hollow form in the mold.

Signed at Toledo, in the county of Lucas and State of Ohio, this 20th day of February, 1922.

LEONARD D. SOUBIER.